(12) United States Patent
Hoffman et al.

(10) Patent No.: US 10,614,381 B2
(45) Date of Patent: Apr. 7, 2020

(54) PERSONALIZING USER EXPERIENCES WITH ELECTRONIC CONTENT BASED ON USER REPRESENTATIONS LEARNED FROM APPLICATION USAGE DATA

(71) Applicant: Adobe Inc., San Jose, CA (US)

(72) Inventors: Matthew Hoffman, San Francisco, CA (US); Longqi Yang, New York, NY (US); Hailin Jin, San Jose, CA (US); Chen Fang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 700 days.

(21) Appl. No.: 15/381,637

(22) Filed: Dec. 16, 2016

(65) Prior Publication Data

US 2018/0174070 A1    Jun. 21, 2018

(51) Int. Cl.
- *G06N 7/00* (2006.01)
- *G06N 20/00* (2019.01)

(Continued)

(52) U.S. Cl.
CPC ............. *G06N 20/00* (2019.01); *G06N 7/005* (2013.01); *G06Q 30/0255* (2013.01);

(Continued)

(58) Field of Classification Search
None
See application file for complete search history.

(56) References Cited

U.S. PATENT DOCUMENTS

| | | | | |
|---|---|---|---|---|
| 2010/0107141 A1* | 4/2010 | Fitzmaurice | .......... | G06F 3/0237 717/123 |
| 2013/0282630 A1* | 10/2013 | Attenberg | ............. | G06N 20/00 706/12 |
| 2016/0259857 A1* | 9/2016 | Wang | ...................... | H04L 67/22 |
| 2017/0132528 A1* | 5/2017 | Aslan | ..................... | G06N 20/00 |

(Continued)

OTHER PUBLICATIONS

"CommunityCommands: Command Recommendations for Software Applications," Justin Matejka, Wei Li, Tovi Grossman, George Fitzmaurice, UIST'09, Oct. 4-7, 2009, Victoria, B.C., Canada. Copyright © 2009 ACM 978-1-60558-745-5/09/10. IDS filed Dec. 16, 2016 (Year: 2009).*

(Continued)

*Primary Examiner* — Hal Schnee
(74) *Attorney, Agent, or Firm* — Kilpatrick Townsend & Stockton LLP

(57) ABSTRACT

This disclosure involves personalizing user experiences with electronic content based on application usage data. For example, a user representation model that facilitates content recommendations is iteratively trained with action histories from a content manipulation application. Each iteration involves selecting, from an action history for a particular user, an action sequence including a target action. An initial output is computed in each iteration by applying a probability function to the selected action sequence and a user representation vector for the particular user. The user representation vector is adjusted to maximize an output that is generated by applying the probability function to the action sequence and the user representation vector. This iterative training process generates a user representation model, which includes a set of adjusted user representation vectors, that facilitates content recommendations corresponding to users' usage pattern in the content manipulation application.

20 Claims, 7 Drawing Sheets

(51) Int. Cl.
*G06T 11/00* (2006.01)
*G06Q 30/02* (2012.01)
*H04W 12/06* (2009.01)
*H04L 29/08* (2006.01)

(52) U.S. Cl.
CPC .......... *G06Q 30/0277* (2013.01); *G06T 11/00* (2013.01); *H04L 67/22* (2013.01); *H04W 12/06* (2013.01)

(56) References Cited

U.S. PATENT DOCUMENTS

2018/0084078 A1* 3/2018 Yan .................. H04L 67/327
2019/0205792 A1* 7/2019 Huang ................ G06F 9/4881

OTHER PUBLICATIONS

Khan, M.A.A., Dziubak, V. and Bunt, A., Exploring Personalized Command Recommendations Based on Information Found in Web Documentation, In Proceedings of the 20th International Conference on Intelligent User Interfaces, ACM, Mar. 2015, 11 pages.

Li, W., Matejka, J., Grossman, T., Konstan, J.A. and Fitzmaurice, G., Design and evaluation of a command recommendation system for software applications, ACM Transactions on Computer-Human Interaction (TOCHI), 18(2), Jun. 2011, 35 pages.

Matejka, J., Li, W., Grossman, T. and Fitzmaurice, G., Community Commands: Command Recommendations for Software Applications, In Proceedings of the 22nd annual ACM symposium on User interface software and technology, ACM, Oct. 2009, 10 pages.

Van Den Oord, A., Dieleman, S. and Schrauwen, B., "Deep Content-Based Music Recommendation", In Advances in Neural Information Processing Systems, Dec. 2013, 9 pages.

Weston, J., Bengio, S. and Usunier, N., Wsabie: Scaling Up to Large Vocabulary Image Annotation, IJCAI'11 Proceedings of the Twenty-Second International Joint Conference on Artificial Intelligence, 3, Jul. 2011, 7 pages.

* cited by examiner

PERSONALIZING USER EXPERIENCES WITH ELECTRONIC CONTENT BASED ON USER REPRESENTATIONS LEARNED FROM APPLICATION USAGE DATA

TECHNICAL FIELD

This disclosure relates generally to artificial intelligence used in providing customized computing experiences for users. More specifically, but not by way of limitation, this disclosure relates to training machine-learning algorithms based on application usage data to learn user representation vectors, which indicate software usage patterns and thereby allow one or more of online content services, content manipulation applications, and other electronic content to be customized in a manner that optimizes an end user's experience.

BACKGROUND

Online content services (e.g., collaborative creative services such as Behance®, social media services, etc.) may be customized for certain users to enhance the users' experience. User characteristics for the online content services are modeled and used to match certain online content items (e.g., interesting creative projects) to certain users for recommendation purposes. These modeling techniques thereby increase the user's satisfaction with his or user experience in the online content service. For example, such models derive a real-valued vector for each user that summarizes his or her preferences, habits, and traits in online social platforms. These vectors, which represent users, are generated based on characteristics such as users' ratings of certain online content items, purchases, content consumption, reviews, etc.

However, existing solutions for content customization present disadvantages. For example, models used by existing solutions may rely on user actions that include explicit expressions or indications of a user preference (e.g., ratings, purchases, comments, etc.). But these solutions may fail to leverage other types of data having latent information about user characteristics. For instance, as users perform various actions in content manipulation applications (e.g., image manipulation applications such as Adobe® Photoshop, content creation tools, etc.), log data describing these actions is automatically generated and recorded for collecting application usage statistics and reproducing program errors. The application usage records include noise (e.g., information about user actions without discernible patterns) and are stored in an unstructured manner. The noisy and unstructured nature of application usage records discourages or prevents providers of software applications and online services from using the application usage records to identify user characteristics. Furthermore, if an online content service, such as Behance®, lacks access to usage records generated by a different application, such as Adobe® Photoshop, and the online service is unable to derive any information about a user from those records.

Thus, existing solutions may provide insufficient content customization or other disadvantages for reasons such as (but not limited to) those described above.

SUMMARY

Certain embodiments involve personalizing user experiences with electronic content based on user representations learned from application usage data. For example, a user representation model that facilitates content recommendations is iteratively trained with action histories from a content manipulation application. Each iteration involves selecting, from an action history for a particular user, an action sequence including a target action. An initial output is computed in each iteration by applying a probability function to the selected action sequence and a user representation vector for the particular user. The user representation vector is adjusted to maximize an output that is generated by applying the probability function to the action sequence and the user representation vector. This iterative training process generates a user representation model, which includes a set of adjusted user representation vectors, that facilitates content recommendations corresponding to users' usage pattern in the content manipulation application.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of an action history that may be used to learn, derive, or otherwise obtain a user representation vector for a user of a content manipulation application, according to certain embodiments.

FIG. 3 depicts an example of a viewing history that may be used to learn, derive, or otherwise obtain item representation vectors for content items in an online content service and view-based user representation vectors for users of the online content service, according to certain embodiments.

DETAILED DESCRIPTION

Figure 1:
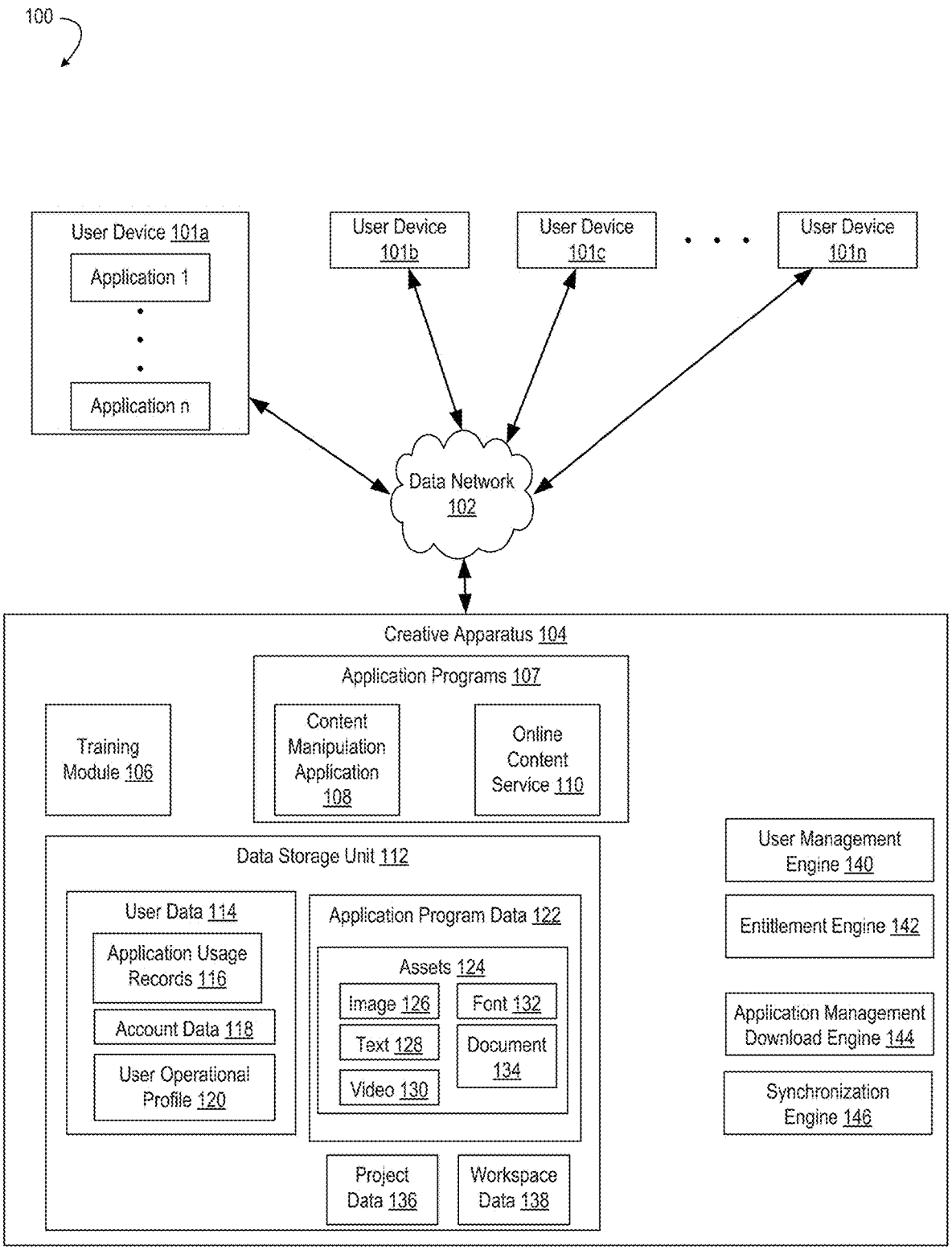
FIG. 1 depicts an example of a network environment for personalizing content for users based on user representations learned from application usage data, according to certain embodiments.

The present disclosure includes systems and methods for personalizing user experiences with electronic content based on user representations that are learned from application usage data. As explained above, conventional solutions are unable to effectively model users for content customization (e.g., by making content recommendations an online content service) based on unstructured log traces and other application usage records generated from content manipulation applications or other software applications. Certain embodiments described herein can more effectively model users for customization purposes by generating user representation vectors, which accurately indicate software usage patterns specific to certain users or types of users, based on application usage records. For instance, historical sequences of user actions, which are extracted from application usage records, are used to train a user representation model, which includes user representation vectors as model parameters, to accurately predict certain user actions from a sequence of user actions. The trained user representation model uses an input action sequence to derive a particular user representation vector, which is in turn used for customizing user experiences in applications and service that rely on accurate models of user behavior. For example, the user representation vector may facilitate providing useful content recommendations in online content services.

The following non-limiting example is provided to introduce certain embodiments. In this example, a computing system determines a user representation in a software application and makes content recommendations to the user in a separate online service based on the determined user representation. For instance, a user's activity in a content manipulation application, such as Adobe® Photoshop, may relate to the user's behavior in an online content service, such as Behance®. For example, the image manipulation tasks performed in the Adobe® Photoshop platform may indicate the user's interests in certain artwork or other creative projects that are accessible in the Behance® platform.

To leverage these relationships for content recommendations or other customization operations, a training module or other suitable program analyzes application usage records to identify user representations and the corresponding cross-platform relationships. The application usage records include action histories, which identify sequences of actions performed by users in the content manipulation application, and viewing histories, which identify content views (or other content interactions) by users in the online content service. The training module learns a first set of user representation vectors based on the user action histories. This learning process involves optimizing a user representation model, which includes user representation vectors that are iteratively adjusted in the learning process, for accurately predicting a target action from a sequence of actions in the content manipulation application. The training module also learns second user representation vectors based on user viewing histories in the online content service. A recommendation model in the online content service can use these user representation vectors, along with item representation vectors that represent certain content items in the online content service, to determine certain users' preferences for certain content items.

Continuing with this example, the training module also learns a correspondence between a given user's representation with respect to the content manipulation application and the user's representation with respect to the online content service. This correspondence is learned by identifying and refining a projection function that accurately transforms the first user representation vectors (i.e., the vectors computed using content manipulation application data) into the second user representation vectors (i.e., the vectors computed using online content service data). In this manner, user representation vectors from the content manipulation application can be mapped to corresponding user representation vectors that are usable for generating recommendations in the online content service.

With these features, an online content service may be customized based on a user's action history in a separate content manipulation application. For example, the trained user representation model is used to derive a user representation vector based on a subsequently received action history from a content manipulation application (e.g., application usage data from Adobe® Photoshop). The derived user representation vector is transformed by applying the learned projection function, and the transformed user representation vector is usable by an online content service (e.g., Behance®) for content customization. In particular, the online content service's recommendation model is applied to the transformed user representation vector to generate content recommendations that are used to customize the online content service to the user. Thus, in certain embodiments, a user's history in a separate application (e.g., actions performed in the content manipulation application) allows the online content service to be customized to the user, even if the online content service lacks data about the user that is specific to the content service (e.g., because a user of the content manipulation application has not previously used the online content service).

For illustrative purposes, various embodiments are described herein using examples that involve action histories from a content manipulation application. Content manipulation applications include image processing applications, graphical applications, content creation applications, word processing applications, and any other application in which a user may generate, edit, or otherwise manipulate content for creative purposes. But histories of user actions in other types of applications may also be used without departing from the scope of this disclosure, and other embodiments may involve any application usage records that are suitable for optimizing the user representation models described herein. For example, actions performed in an online content service may be used for optimizing a user representation model from which a user representation vector may be derived.

Likewise, certain embodiments are described herein using examples in which user representations are mapped from content manipulation applications to online content services to generate recommendations in the online content services. Online content services include social media services, collaborative creative services such as Behance®, and other Web-based services that allow users to purchase, post, view, or otherwise access online content from one or more online sources. But user representations generated by action histories may be used for generating other types of recommendations without departing from the scope of this disclosure. In one example, a user representation vector generated in a first content manipulation application (e.g., Adobe® Photoshop) may be used to provide suggested commands, suggested layouts, or other suggested customization in a second content manipulation application (e.g., Adobe® Premiere Pro). In another example, a user representation vector generated from an action history within an online content service (e.g., Behance®) may be used to provide suggested commands, suggested layouts, or other suggested customizations in a content manipulation application (e.g., Adobe® Premiere Pro).

Referring now to the drawings, FIG. 1 depicts an example of a network environment for personalizing electronic content based on user representations learned from application usage data, according to certain embodiments. In the example depicted in FIG. 1, various user devices 101a-n access a creative apparatus 104 via a data network 102. The creative apparatus 104 executes one or more training modules 106 (or other suitable program code) for learning user representations for customizing content in one or more applications or services that are available via the creative apparatus 104, such as a content manipulation application 108, an online content service 110, or both. Examples of customizing content include, but are not limited to, providing recommendations of content items that are available via an online content service 110, providing suggested tags for content in a content manipulation application 108, providing a suggested layout of content or menu options in an application or service, providing suggested commands for an operation in an application or service, etc. In some embodiments, the training module 106 is executed by a creative apparatus 104 using data stored on a data storage unit 112. Examples of this data include such as user data 114 and associated application usage records 116. Examples of the application usage records 116 include log traces, viewing histories, or other records describe how users have used the content manipulation application 108, the online content service 110, or both.

The user devices 101-n correspond to various users. Examples of the user devices 101a-n include, but are not limited to, a personal computer, tablet computer, a desktop computer, a processing unit, any combination of these devices, or any other suitable device having one or more processors. Each user device includes at least one application supported by the creative apparatus 104. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include tools such as the content manipulation application 108 and the online content service 110 that are used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Each of the user devices 101-n is communicatively coupled to the creative apparatus 104 via the network 102. A user of the user devices uses various products, applications, or services supported by the creative apparatus 104 via the network 102. Examples of the network 102 include, but are not limited to, internet, local area network ("LAN"), wireless area network, wired area network, wide area network, and the like.

The creative apparatus 104 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 104.

The creative apparatus 104 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 104 also includes a data storage unit 112. The data storage unit 112 can be implemented as one or more databases or one or more data servers. The data storage unit 112 includes data that is used by the training module 106 and other engines of the creative apparatus 104.

The user uses one or more application programs 107, which can include one or more of the content manipulation application 108 and the online content service 110, to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 122 in the data storage unit 112 by a synchronization engine 146. The application program data 122 can be specific to the user or can be shared with other users based on rights management.

In some embodiments, the application program data 122 includes one or more assets 124. The assets 124 may include shared assets that the user wants to share with other users or that the user wants to offer on a marketplace. The assets 124 can also be shared across multiple application programs 107. In some embodiments, each asset includes metadata.

In some embodiments, each asset also includes a file. Examples of the file include, but are not limited to, an image 126, text 128, a video 130, a font 132, a document 134, a combination of any of these, and the like. In another embodiment, an asset only includes the metadata. The application program data 122 also include project data 136 and workspace data 138. In some embodiments, the project data 136 includes copies of the assets 124 or the assets 124 themselves. In additional or alternative embodiments, the assets 124 are standalone assets. Similarly, the workspace data 138 can be part of the project data 136 in some embodiments and may be standalone data in other embodiments.

In some embodiments, the user can have one or more user devices (e.g., user devices 101a-n). The application program data 122 is accessible by the user from any device (e.g., device 101b), including a device that was not used to create the assets 124 (e.g., device 101c). This is achieved by the synchronization engine 146 that stores the application program data 122 in the data storage unit 112 and makes the application program data 122 available for access by the user or other users via any device. Before accessing the application program data 122 by the user from any other device or by any other user, the user or the other user may need to provide login details for authentication if not already logged in. Else, if the user or the other user is logged in then a newly created asset or updates to the application program data 122 are provided in real time. The workspace data 138 enables the synchronization engine 146 to provide same workspace configuration to the user on any other device or to the other user based on rights management data.

In some embodiments, a user of one or more of the user devices 101a-n visits a webpage or an application store to explore applications supported by the creative apparatus 104 (e.g., the content manipulation application 108, the online content service 110, etc.). The creative apparatus 104 provides the applications (e.g., the content manipulation application 108, the online content service 110, etc.) as a software as a service ("SaaS"), or as a standalone application that can be installed on the user device 101, or as a combination.

In some embodiments, the user creates an account with the creative apparatus 104 by providing user details and by creating login details. Alternatively, the creative apparatus 104 can automatically create login details for the user in response to receipt of the user details. In some embodiments, the user is also prompted to install an application manager. The application manager enables the user to manage installation of various applications supported by the creative apparatus 104 and to manage other functionalities, such as updates, subscription account and the like, associated with the applications. The user details are received by a user management engine 140 and stored as user data 114 in the data storage unit 112. In some embodiments, the user data 114 further includes account data 118 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 120 is generated by an entitlement engine 142. The user operational profile 120 is stored in the data storage unit 112 and indicates entitlement of the user to various products or services. In some embodiments, the user operational profile 120 also indicates type of user, i.e. free, trial, student, discounted, or paid. In some embodiments, the user management engine 140 and the entitlement engine 142 can be one single engine performing the functionalities of both the engines.

In some embodiments, the user installs various applications supported by the creative apparatus 104 via an application download management engine 144. Application installers or application programs 107 (which may include the content manipulation application 108, tools from the online content service 110, or other software usable to perform operations described herein) are present in the data storage unit 112 and are fetched by the application download management engine 144. These applications are made available to the user directly or via the application manager. In some embodiments, all application programs 107 are fetched and provided to the user via an interface of the application management download engine 144. In other embodiments, application programs 107 for which the user is eligible based on user's operational profile are displayed to the user. The user selects the application programs 107 that the user wants to download. The application programs 107 are downloaded on one or more of the user devices 101a-n by the application manager via the application download management engine 144. Corresponding data regarding the download is also updated in the user operational profile 120. An application program 146 is an example of a digital tool. The application download management engine 144 also manages a process of providing updates to the user device 101.

In some embodiments, upon download, installation, and launching of an application program, the user is asked to provide the login details. A check is again made by the user management engine 140 and the entitlement engine 142 to ensure that the user is entitled to use the application program. In other embodiments, direct access is provided to the application program as the user is already logged into the application manager.

As described in detail with respect to the various examples below, the training module 106 is used to develop and use a user representation model according to various embodiments. For instance, a user representation model is optimized by the training module 106 and is used to derive or otherwise obtain user representations for users of one or more content manipulation applications 108. In some embodiments, the user representation model encodes, in a user representation vector, one or more patterns of actions that a given user has performed in the content manipulation application 108 or other software applications.

In some embodiments, the creative apparatus 104 (or another suitable computing system) uses a trained user representation model to generate content recommendations for users of an online content service 110. One or more training modules 106 are used to optimize or otherwise refine a projection function used for mapping users from the content manipulation application 108 to the online content service 110, or vice versa. For instance, the projection function transforms an initial user representation vector for the content manipulation application 108, which is derived using the user representation model, into a user representation vector that is suitable for use in the online content service 110. In this manner, a given user's characteristics in a first domain (e.g., the user's expertise or preferences in the content manipulation application 108) are projected into a second domain (e.g., the online content service 110) in a manner that allows the user's experience in the second domain to be accurately customized to the user.

In one example, application usage records 116 (e.g., usage traces) may be available for a given user with respect to the content manipulation application 108, but not the online content service 110 (e.g., because the user has not previously accessed the online content service 110). The trained user representation model, which is developed with the application usage records 116 from the content manipulation application 108, is used to develop a user representation vector for the user. A learned projection function is applied to the user representation vector. Applying the projection function transforms the user representation vector into a transformed user representation vector, which is usable in a recommendation model for generating content recommendations in the online content service 110.

To develop and refine the user representation model and the projection function, the training module 106 associates action histories from the content manipulation application 108 (e.g., actions performed in an image manipulation application such as Adobe® Photoshop) with viewing or other interaction histories from the online content service 110 (e.g., social interactions in a collaborative creative service such as Behance®). The training module 106 associates these histories using, for example, account data 118 hosted by the creative apparatus 104. The account data 118 includes user account information to authenticate and authorize users of both the content manipulation application 108 and the online content service 110.

Figures 2, 3:
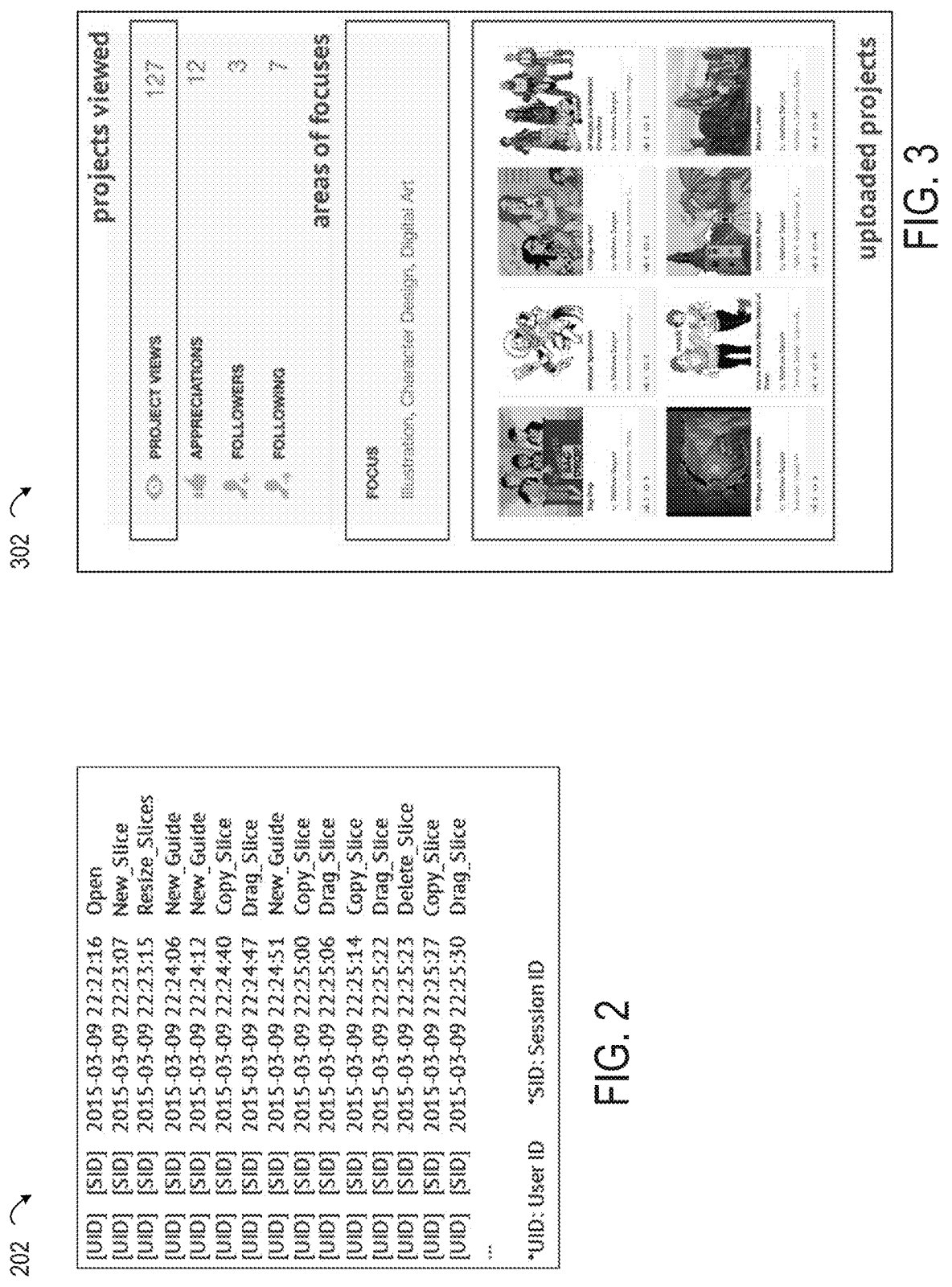

In some embodiments, application usage records 116 are generated by a module in the content manipulation application 108 (or other program code executed by the creative apparatus 104) that logs some or all of the actions performed in content manipulation application 108. FIG. 2 depicts an example of an action history 202 that may be used to learn, derive, or otherwise obtain a user representation vector for a user of a content manipulation application 108. Examples of actions performed in the content manipulation application 108 include button clicks, menu selections, etc. In some embodiments, these actions are logged based on a user having enabled application usage reporting for the content manipulation application 108.

In some embodiments, additional application usage records 116 are also generated by a module in the online content service 110 (or other program code executed by the creative apparatus 104) that logs some or all of user interactions in the online content service 110 (e.g. views of content items, manipulations of content items, etc.). FIG. 3 depicts an example of a viewing history 302 that may be used to learn, derive, or otherwise obtain a view-based user representation vector for a user of an online content service 110 and an item representation vector for a content item in an online content service 110. Examples of views or other interactions performed in the online content service 110 include views of projects uploaded to the online content service 110, areas of focus identified by users (e.g. "Cartooning," "Interaction Design," "Fashion," etc.), user-uploaded projects, etc.

Figure 4:
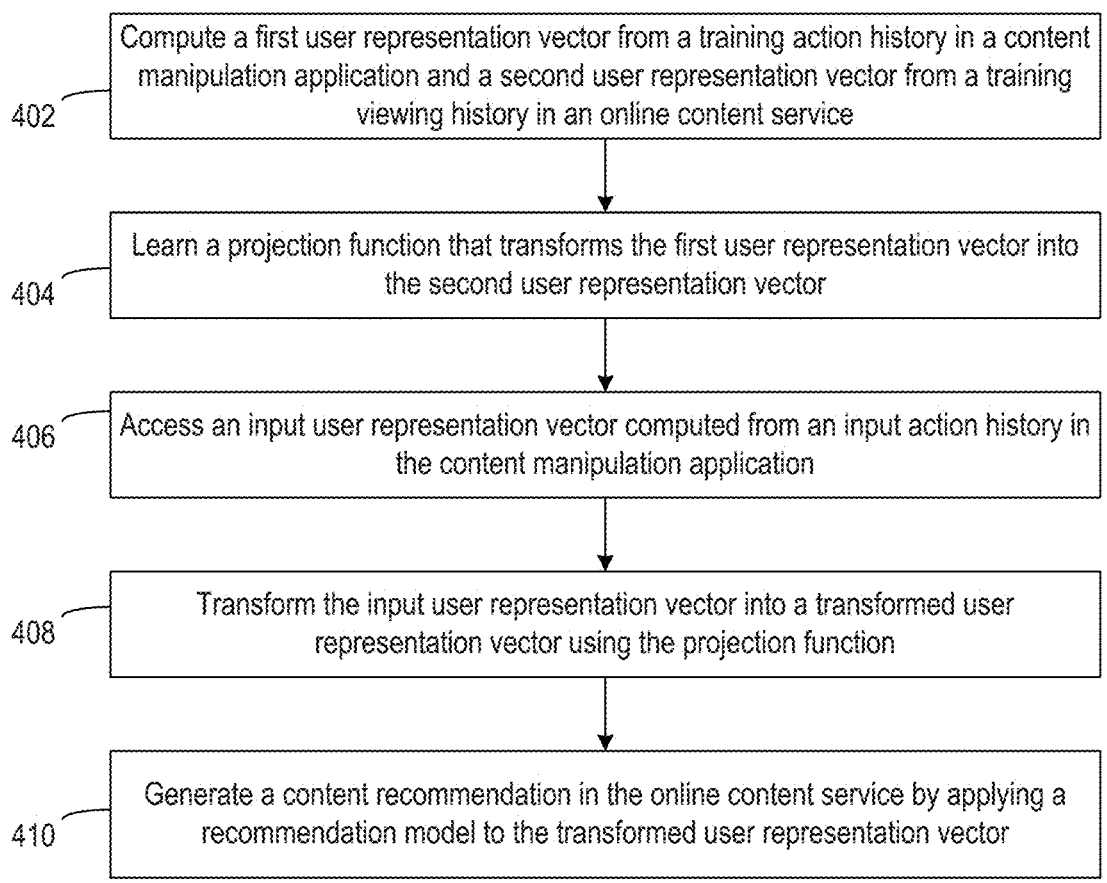
FIG. 4 depicts an example of a process for personalizing content for users based on user representations learned from application usage data, according to certain embodiments.

The training module 106 is used to develop, based on the application usage records 116, models for customizing user experiences in one or more of the content manipulation application 108, the online content service 110, or other software applications or services. For example, FIG. 4 depicts an example of a method 400, which may be performed by the creative apparatus 104 or another suitable computing, for personalizing content for users based on user representations learned from application usage data, according to certain embodiments. In some embodiments, one or more processing devices implement operations depicted in FIG. 4 by executing suitable program code (e.g., the training module 106, the online content service 110, etc.). For illustrative purposes, the method 400 is described with reference to certain examples depicted in the figures. Other implementations, however, are possible.

At block 402, the method 400 involves computing (i) a first user representation vector from a training action history in a content manipulation application and (ii) a second user representation vector from a training viewing history in an online content service. A processing device executes one or more training modules 106 or other program code to compute the first and second representation vectors.

For example, the program code for the training module 106, which is stored in a non-transitory computer-readable medium, is executed by one or more processing devices. Executing the training module 106 causes the processing device to access training data, which includes one or more training action histories and one or more training viewing histories, that is stored in the non-transitory computer-readable medium or a different non-transitory computer-readable medium. In some embodiments, accessing the training data involves communicating, via a data bus, suitable signals between a local non-transitory computer-readable medium and the processing device. In additional or alternative embodiments, accessing the training data involves communicating, via a data network, suitable signals between a computing system that includes the non-transitory computer-readable medium and a computing system that includes the processing device. The training module 106 executes one or more operations, described further with respect to the examples depicted in FIGS. 5-7, to generate the user representation vectors. The training module 106 causes one or more processing devices to store data in a non-transitory computer-readable medium that includes the generated user representation vectors.

In some embodiments, one or more first user representation vectors are computed by, for example, optimizing a user representation model or other probability model associated with the training action history. The user representation model includes a probability function that is used for predicting, based on a sequence of actions performed in the content manipulation application, the probability of a target action from the sequence being performed in the content manipulation application. For example, as described further with respect to FIGS. 6 and 7, the training module 106 maximizes a probability function that predicts the target action from a set of previous actions prior to the target action and a set of subsequent actions following the target action. These sequences of prior actions and subsequent actions are sampled from the user action history. Optimizing the user representation model involves iteratively modifying a set of model parameters that include a set of user representation vectors, which include one or more first representation vectors referenced in block 402.

In some embodiments, one or more second user representation vectors are computed by, for example, learning the second user representation vectors and associated item representations using a recommendation model. The recommendation model is used for predicting user preferences for content items in, for example, an online content service 110. For instance, the training module 106 accesses, from a non-transitory computer-readable medium, a recommendation model that generates recommendation values from vectors that represent users and content items. The recommendation values indicate a user preference or interest for a content item. As described further with respect to FIG. 8, optimizing the recommendation model involves iteratively computing the item representation vectors and user representation vectors, where the user representation vectors include one or more second user representation vectors referenced in block 402. For instance, optimizing the probability model involves iteratively modifying a set of model parameters that include a set of user representation vectors, which include the second representation vector of block 402, such that the recommendation values generated by the recommendation model are proportional to the preference of a represented user for a represented item.

At block 404, the method 400 involves learning a projection function that transforms the first user representation vector into the second user representation vector. A processing device executes one or more training modules 106 or other program code to learn the projection function from a set of user representation vectors (including the first user representation vector) generated from the content manipulation application 108 and a corresponding set of user representation vectors (including the second user representation vector) generated from the online content service 110.

The learned projection function transforms an initial user representation vector for the content manipulation application 108 into a user representation vector that is suitable for use in the online content service 110, or vice versa. Thus, the learned projection function projects a user's characteristics from the content manipulation application 108 into user characteristics for the online content service 110.

For example, the program code for the training module 106, which is stored in a non-transitory computer-readable medium, is executed by one or more processing devices. Executing the training module 106 causes the processing device to access a first set of user representation vectors, which are generated using action histories from the content manipulation application 108, and a second set of user representation vectors, which are generated using viewing histories from the online content service 110, that are stored in the non-transitory computer-readable medium or a different non-transitory computer-readable medium. In some embodiments, accessing the representation vectors involves communicating, via a data bus, suitable signals between a local non-transitory computer-readable medium and the processing device. In additional or alternative embodiments, accessing the representation vectors involves communicating, via a data network, suitable signals between a computing system that includes the non-transitory computer-readable medium and a computing system that includes the processing device. The training module 106 executes one or more operations, described further with respect to one or more examples depicted in FIGS. 5-8, to learn the projection function. The training module 106 causes one or more processing devices to store code in a non-transitory computer-readable medium that includes the learned projection function.

At block 406, the method 400 involves accessing an input user representation vector computed from an input action history in the content manipulation application. A processing device executes the online content service 110 or other program code to access the input user representation vector. In some embodiments, one or more processing devices execute the training module 106, the online content service 110, or other suitable program code to obtain the input user representation vector from a user representation model, which is optimized in a process for computing a first user representation vector referenced in block 402.

For example, the program code for the online content service 110, which is stored in a non-transitory computer-readable medium, is executed by one or more processing devices. In some embodiments, executing the program code causes a computing system to compute or otherwise derive the input user representation vector by fitting the input user action history to the user representation model. The computing system accesses the computed input user representation vector from a non-transitory computer-readable medium. In some embodiments, accessing one or more of user representation model and the input user representation vector involves communicating, via a data bus, suitable signals between a local non-transitory computer-readable medium and the processing device. In additional or alternative embodiments, accessing one or more of the user representation model and the input user representation vector involves communicating, via a data network, suitable signals between a computing system that includes the non-transitory computer-readable medium and a computing system that includes the processing device.

In some embodiments, computing or otherwise deriving the input user representation vector involves selecting, from the trained user representation model, an optimized or otherwise adjusted user representation vector that is included as a parameter of the trained user representation model. In one example, the user representation model includes a probability function that computes the probability of the target action from (i) a set of previous actions performed before the target action and (ii) a set of subsequent actions performed after the target action. The user representation model also includes, as model parameters, a set of user representation vectors. The user representation vectors have dimension values that are optimized or otherwise adjusted via the training process. (This training process is described further with respect to one or more examples depicted in FIGS. 5-8.)

Continuing with this example, a computing system computes or otherwise derives the input user representation vector by using an input action history to select one or more of the user representation vectors that have been optimized or otherwise adjusted via the training process. For example, the computing system samples or otherwise extracts one or more sequences of actions from the input action history. The computing system uses the selected sequence or sequences to provide inputs to the probability function of the trained user representation model. The computing system selects one or more of the user representation vectors that maximize the probability function for the sampled sequences of actions from the input action history. The selected user representation vector is used as the input user representation vector.

At block 408, the method 400 involves transforming the input user representation vector into a transformed user representation vector using the projection function. A processing device executes the online content service 110 or other program code to generate the transformed user representation vector. For instance, the program code for the online content service 110, which is stored in a non-transitory computer-readable medium, is executed by one or more processing devices to transform the input user representation vector. Generating the transformed user representation vector involves, for example, inputting the input user representation vector into the projection function and outputting the transformed user representation vector from the projection function.

At block 410, the method 400 involves generating a content recommendation in the online content service by applying a recommendation model to the transformed user representation vector. For instance, the program code for the online content service 110, which is stored in a non-transitory computer-readable medium, is executed by one or more processing devices to generate the content recommendation. Generating the content recommendation involves applying the recommendation model to the transformed user representation vector, which is usable by the online content service 110, to generate one or more recommendation values for content items accessible via the online content service 110.

Figure 5:
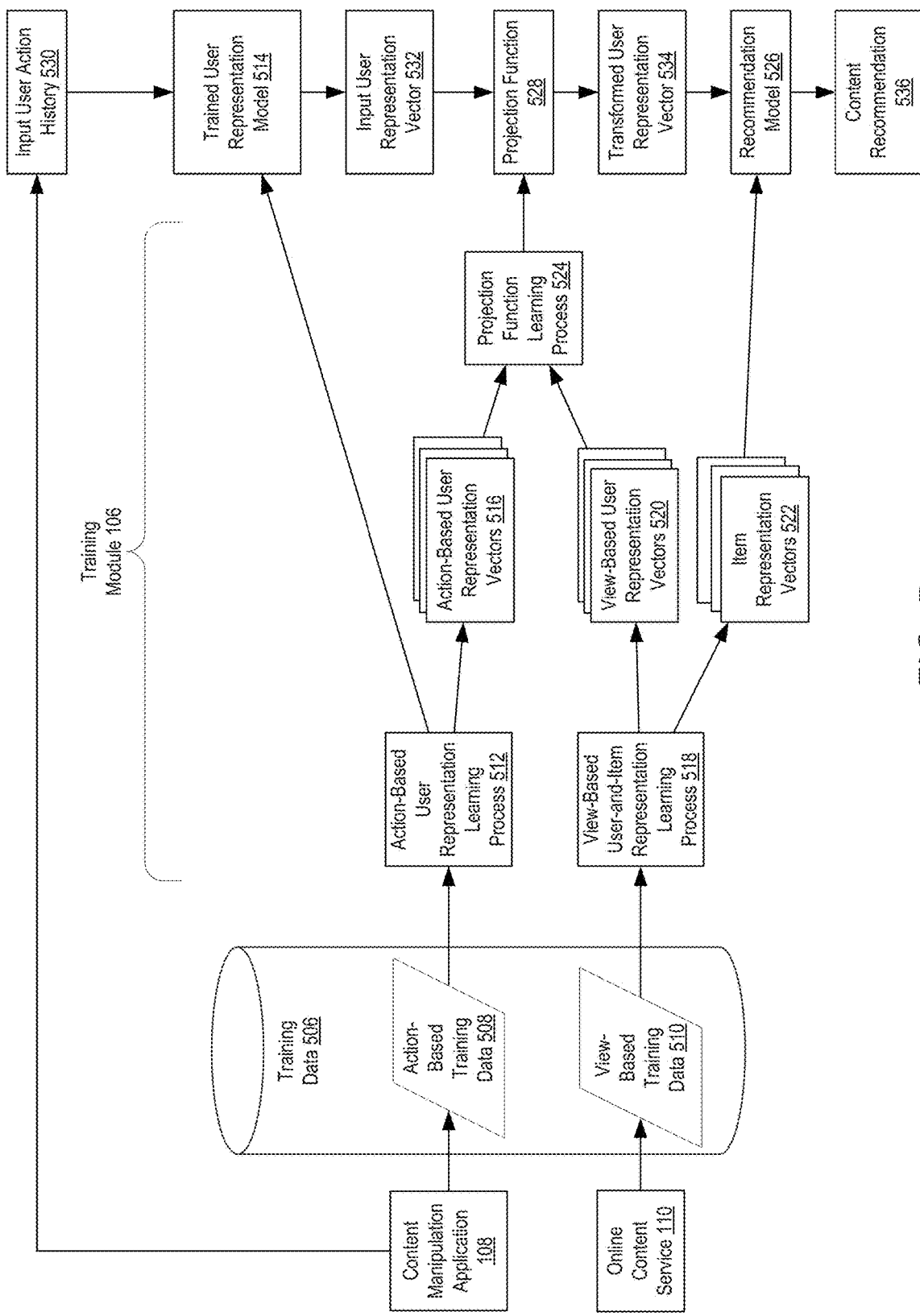
FIG. 5 depicts an example of a flow of communications for learning user representation vectors that are usable for personalizing content in the method of FIG. 4, according to certain embodiments.

FIG. 5 depicts an example of a flow of communications for learning user representation vectors that are usable for personalizing content, according to certain embodiments. In this example, the training module 106 accesses training data 506 that includes action-based training data 508, which is generated using the content manipulation application 108, and view-based training data 510, which is generated using the online content service 110.

The training module 106 executes an action-based user representation learning process 512 using the action-based training data 508. The action-based user representation learning process 512 optimizes or otherwise develops a user representation model 514. Optimizing or otherwise developing the user representation model 514 involves computing or otherwise obtaining action-based user representation vectors 516, which can include the first user representation vectors discussed above with respect to block 402 in FIG. 4. The user representation model 514 is usable for computing a user representation vector (e.g., a fixed-length real-valued vector that represents a user's software usage pattern in a content manipulation application 108), such as an input user representation vector as described above with respect to block 406 in FIG. 4.

In some embodiments, as discussed above with respect to FIG. 4, the trained user representation model 514 facilitates generating content recommendations in the online content service 110. An example of a situation in which content recommendations may be generated using the trained user representation model 514 is a "cold start" for an online content service 110. One example of a cold start involves a given user accessing the online content service 110 for the first time. Another example of a cold start involves a given user accessing the online content service 110 before a viewing history is available to the online content service 110 for personalizing the user's experience in the online content service 110.

In a cold-start situation for a given user, the online content service 110 or another platform lacks information about the user's activities within the online content service 110 or other platform. In the absence of an option for estimating information about the user, typical solutions for a cold-start problem include recommending the most popular items (which are not personalized to a particular user) or leveraging user information such as gender, age, and personal data traces. But the training module 106 described herein can provide improved customization, as compared to these typical solutions, by leveraging application usage records 116 that are available for another domain, such as the user's action history in the content manipulation application 108.

In some embodiments, for any user of the content manipulation application 108, the creative apparatus 104 or other system generates cold-start recommendations by first predicting a user's latent factors based on her application usage data in the content manipulation application 108, and then ranking the recommended content items accordingly in the online content service 110. To do so, the training module 106 executes a view-based user-and-item representation learning process 518. The view-based user-and-item representation learning process 518 causes the training module 106 to learn view-based user representation vectors 520 and item-based representation vectors 522 from available view-based training data 510 that is generated using the online content service 110. The learned view-based representation vectors 520 are indicative of latent user factors associated with certain users' preferences for certain content items in the online content service 110. The learned item-based representation vectors 522 are indicative of latent items factors associated with these preferences. The learned view-based representation vectors 520 and learned item-based representation vectors 522 can be used with a recommendation model 526 to generate recommended items for a user exhibiting certain latent factors.

To leverage application usage records 116 between different software domains (e.g., the content manipulation application 108 and the online content service 110), the training module 106 also learns the projection function 528. The projection function 528 allows a user representation vector that has been computed, derived, or otherwise obtained using the trained user representation model 514 to be transformed into a corresponding view-based user representation vector. In the example depicted in FIG. 5, the user representation model 514 is applied to an input user action history 530 (e.g., an action history from Adobe® Photoshop or another content manipulation application 108). By applying the user representation model 514 to the input user action history 530, the creative apparatus 104 or another suitable system derives an input user representation vector 532. The projection 528 is applied to the input user representation vector 532 to generate a transformed user representation vector 534. The transformed user representation vector 534 is usable with the recommendation model 526 to generate, in the online content service 110, a content recommendation 536. The content recommendation 536 involves one or more recommended items for a user having a certain action history in the content manipulation application 108.

Figure 6:
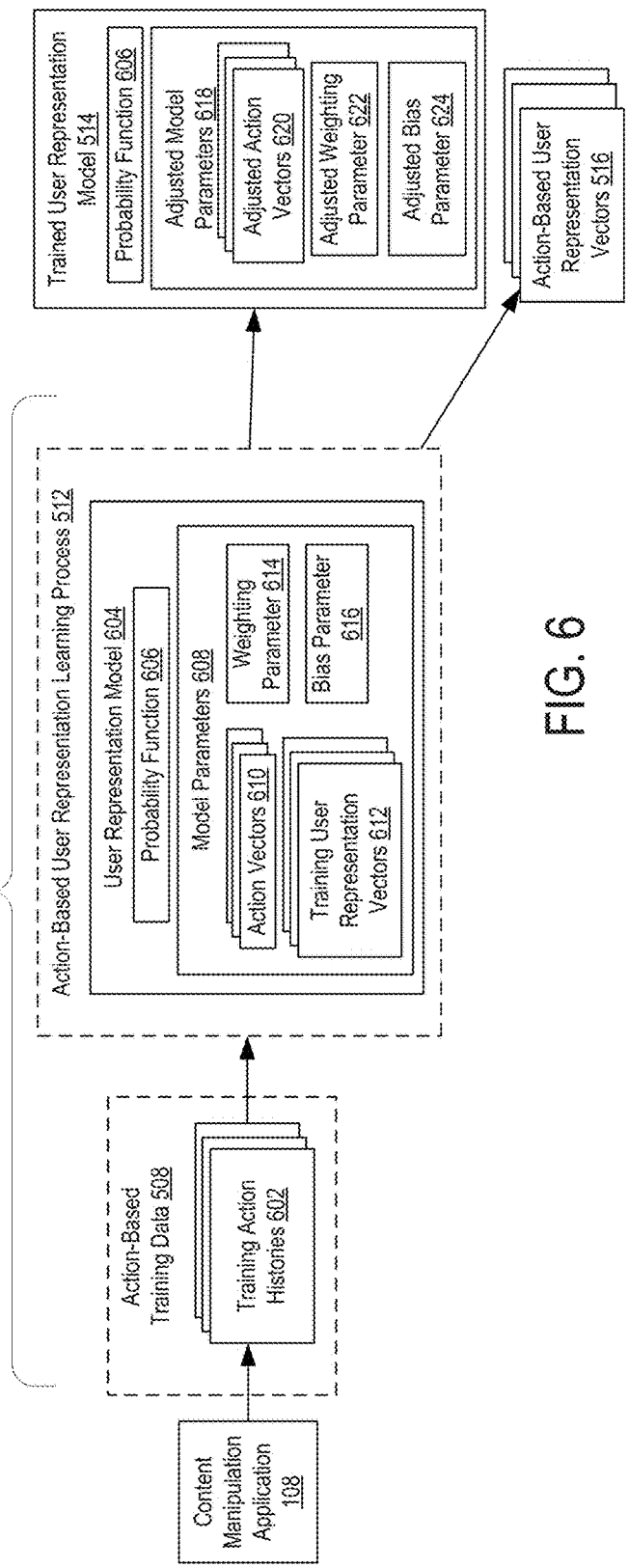
FIG. 6 depicts an example of a flow of communications for optimizing or otherwise developing a user representation model that derives user representation vectors from input action histories, according to certain embodiments.

FIG. 6 depicts an example of a flow of communications for optimizing or otherwise developing the trained user representation model 514. In the example depicted in FIG. 6, the training module 106 uses training action histories 602 from the action-based training data 508 to optimize or otherwise adjust an initial user representation model 604. Optimizing or other adjusting the initial user representation model 604 via the action-based user representation learning process 512, as depicted in FIG. 6, causes the training module 106 to output the trained user representation model 514.

The training action histories 602 include action histories for multiple users of the content manipulation application 108. For example, an action history $H_u$, which is selected from the training action histories 602, identifies a subset of vectors from a set of action vectors 610. M-dimensional action vectors 610 are included in an action representation matrix X. Each of the action vectors 610 encodes a particular action that may be performed in the content manipulation application 108.

In some embodiments, the action history is a set of identifiers $H_u = (a_1^u, a_2^u, \ldots, a_n^u)$, where $a_n^u$ is the nth action in a sequence of actions performed by a user u and the value of $a_n^u$ identifies one of the action vectors 610 from an action representation matrix X. In other embodiments, a given training action history for a user u is represented by a matrix $H_u$ of vectors $(a_1^u, a_2^u, \ldots, a_n^u)$, where the vector $a_n^u$ identifies the nth action in a sequence of actions performed by a user u and is one of the action vectors 610 from the action representation matrix X. (In the various examples of formulas described herein, "$a_n$" is used with the superscript "u" omitted to indicate an action vector that is the nth action in a sequence of actions performed by a user u.)

In an action-based user representation learning process 512, the user representation model 604 is modified such that an M-dimensional user representation vector $v_u$ is learned for the user based on the action history $H_u$. The user representation vector $v_u$ encodes a software usage pattern specific to the user u. In some embodiments, the action-based user representation learning process 512 involves optimizing or otherwise modifying a user representation model 604 that includes a probability function 606 and model parameters 608. The model parameters 608 include the action vectors 610 (which form the columns of an action representation matrix X) and training user representation vectors 612. The training user representation vectors 612 are vectors $v_u$ for a set of users u, and form the columns of a user representation matrix V. In some embodiments, the model parameters 608 also include a weighting parameter 614, such as a weighting matrix W, and a bias parameter 616, such as a bias vector b. In the training process, the training module 106 uses the training action histories 602 with the user representation model 604 to iteratively learn values of model parameters 608 such as the bias vector b, the weighting matrix W, the action representation matrix X, and the user representation matrix V. A trained user representation model 514, which includes these learned values of the model parameters 608, can derive a user representation vector for a new user based on an action history for that new user.

In some embodiments, the action-based user representation learning process 512 involves using a set of actions a for a given user (where the actions are selected from the training action histories 602) to maximize a log probability function (i.e., a probability function 606), such as the function defined in the Equation (1) below:

$$\frac{1}{T-2K}\sum_{t=K}^{T-K} \log p(a_t | a_{t-K}, a_{t-K+1}, \ldots, a_{t+K}). \quad (1)$$

In Equation (1), $p(a_t|a_{t-K}, a_{t-K+1}, \ldots, a_{t+K})$ is the probability of a target action $a_t$ given a sequence of previous actions $a_{t-K}, a_{t-K+1} \ldots a_{t-1}$ prior to the target action $a_t$ and a sequence of subsequent actions $a_{t+1}, a_{t+2} \ldots a_{t+K}$ after the target action $a_t$. T is the total number of actions. K is the farthest action before or after the prediction target. Thus, a sliding window of actions with a window size of 2K+1 is used to maximize Equation 1. The user representation model 604 is optimized or otherwise refined by maximizing the objective function defined in Equation 1, which allows a particular target action to be predicted for a given user and a set of actions surrounding the target action.

Any suitable classifier function can be used to compute the conditional probability P ($a_t|a_{t-K}, a_{t-K+1}, \ldots a_{t+K}$). In some embodiments, the training module 106 computes the conditional probability $p(a_t|a_{t-K}, a_{t-K+1}, \ldots, a_{t+K})$ using the softmax function provided by Equation (2) below:

$$p(a_t | a_{t-K}, a_{t-K+1}, \ldots, a_{t+K}) = \frac{e^{y_{a_t}}}{\sum_i e^{y_i}} \quad (2)$$

The term y in Equation (2) is defined using Equation (3) provided below:

$$y_{a_t} = b + Wh(v_u, a_{t-K}, a_{t-K+1}, \ldots, a_{t+K}; V, X) \quad (3).$$

Equation (3) includes the bias vector b, the weighting matrix W, and a transfer function h. The transfer function h receives, as inputs, a modifiable user representation vector $v_u$ for user u, the relevant sequence of action vectors $a_{t-K}, a_{t-K+1}, \ldots, a_{t+K}$ for user u, the action representation matrix X, and the user representation matrix V. The transfer function h outputs a vector that indicates a relationship between the user u (i.e., the user representation vector $v_u$), a certain sequence of actions by the user u in a sliding window (i.e., the relevant sequence of action vectors $a_{t-K}, a_{t-K+1}, \ldots, a_{t+K}$), and the matrices representing a set of users of the content manipulation application 108 and a set of actions that can be performed in the content manipulation application 108. In some embodiments, the transfer function h concatenates the user representation vector $v_u$, the relevant sequence of action vectors $a_{t-K}, a_{t-K+1}, \ldots, a_{t+K}$, the action vectors 610 in the action representation matrix X, and the training user representation vectors 612 in the user representation matrix V. In other embodiments, the transfer function h averages the user representation vector $v_u$, the relevant sequence of action vectors $a_{t-K}, a_{t-K+1}, \ldots, a_{t+K}$, the action vectors 610 in the action representation matrix X, and the training user representation vectors 612 in the user representation matrix V.

In some embodiments, the training module 106 uses a stochastic gradient descent ("SGD") to perform the training. The user representation model 604 is trained with training action histories 602 from U unique users of the content manipulation application 108 (e.g., 3 million users). In the training process, the action vectors 610 and the training user representation vectors 612 are iteratively updated to maximize the probability function 604 (e.g., Equation 1). For each iteration, the training module 116 selects one of the training action histories 602 for a particular user and samples a sequence of 2K+1 actions from the selected training action history to update the model parameters 608.

The training module outputs the trained user representation model 514 and the action-based user representation vectors 516, which are modified versions of the training user representation vectors 612 that have been modified via the training process. The trained user representation model 514 can derive a user representation vector for a new user. In one example, a computing system uses the trained user representation model 514 by fixing the relevant model parameters 618. The computing system fits a particular user representation vector from the action-based user representation vectors 516 to an input action history for the new user. Relevant model parameters that are fixed include an adjusted action representation matrix X or other adjusted action vectors 620, an adjusted weighting matrix W or other weight parameter 622, and an adjusted bias vector b or other adjusted bias parameter 624.

Figure 7:
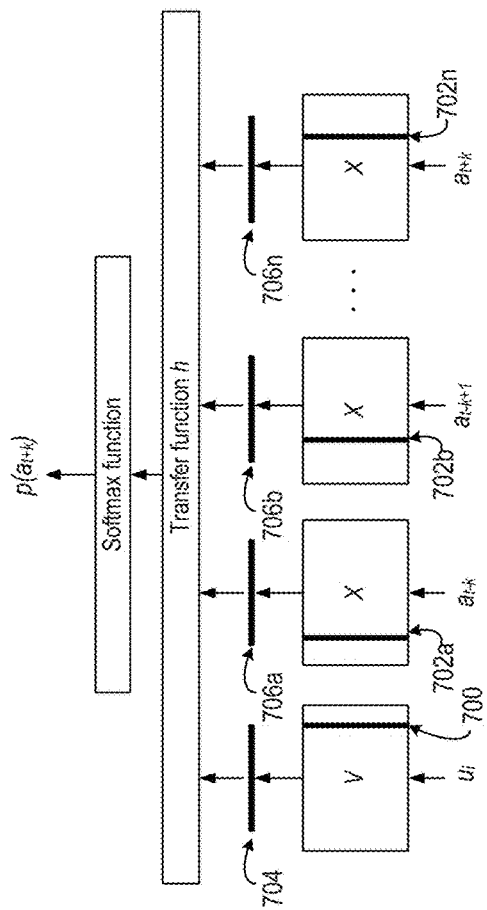
FIG. 7 depicts an example that models a probability function used in developing the user representation model of FIG. 6, according to certain embodiments.

FIG. 7 graphically depicts the framework used in FIG. 6. As depicted in FIG. 7, the training module 106 selects column 700, which corresponds to a certain user, and columns 702a-n, which correspond to a certain sequence of actions for the user. The user representation vector 704 (i.e., the selected column 700) and the ordered set of vectors 706a-n are provided to the transfer function h. The vector outputted by the transfer function h is provided to the softmax function, which calculates a condition probability for the relevant action.

In some cases, the total number of unique actions available for training the user representation model 604 may be large, which can increase the time and resources required for the action-based user representation learning process. Some embodiments can address this issue using negative sampling operations that increase the efficiency with which the user representation model 604 is trained. In one example, the training module 106 randomly samples s actions that are different from the target action $a_t$. The training module 106 approximates the log probability (i.e., log $p(a_t|a_{t-k}, a_{t-k+1}, \ldots, a_{t+k})$) using Equation (4), provided below:

$$\log(\sigma(y_{a_t})) + \sum_{i=1}^{s} \log(\sigma(-y_{a_i})) \quad (4)$$

In Equation (4), the set of actions $a_i(i=1, \ldots, s)$ are the s negative actions sampled by the training module 106. The function σ is the sigmoid function.

Figure 8:
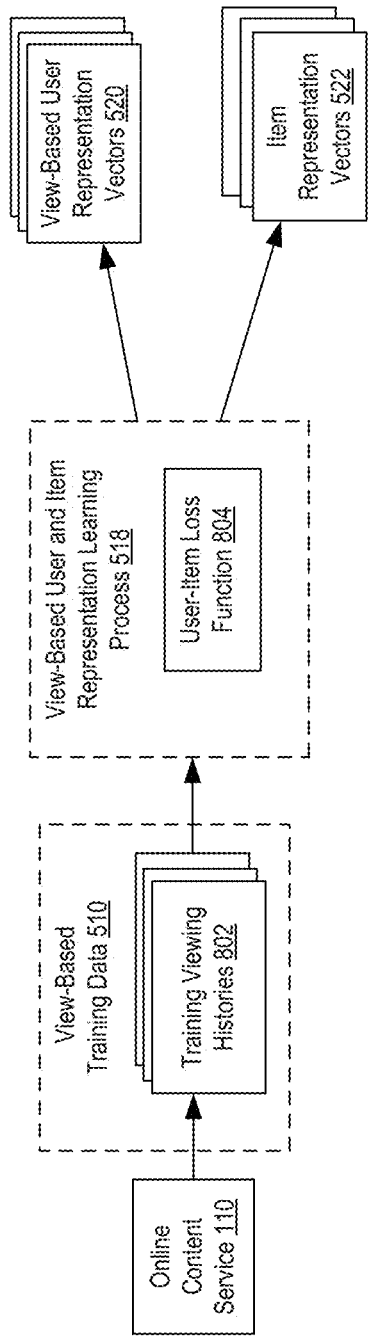
FIG. 8 depicts an example of a flow of communications for learning view-based user representation vectors and item representation vectors that are usable by a recommendation model of an online content service, according to certain embodiments.

As discussed above with respect to FIGS. 4 and 5, the trained user representation model is used in combination with user representations from another domain (e.g., the online content service 110) to provide recommendations for that domain. For instance, FIG. 8 depicts an example of a flow of communications for learning the view-based user representation vectors 520 and the item representation vectors 522 that are described above with respect to FIG. 5. In the example depicted in FIG. 8, the training module 106 uses training viewing histories 802 to learn, for a set of available users of the online content service 110, the view-based user representation vectors 520 and the item representation vectors 522. For instance, the training module 106 learns one or more view-based user representation vectors $l_{u_i}$, which represent latent factors for a user $u_i$. The training module 106 also learns an item representation vector $l_{e_j}$ for each content $e_j$ item in a set of content items from the online content service 110. The item representation vector $l_{e_j}$ for the content $e_j$ item represents a latent factor for the item. The latent factors are characteristics of users, items, or both that are not directly observable from the view-based training data 510 and that impact a user's preference for an item or interest in the item. The training module 106 also learns a bias $b_{e_j}$ such that a recommendation value $r_{ij}$, which is generated by a recommendation model used by the online content service 110 or other application or service, is proportional to user $u_i$'s preference level towards item $e_j$. In some embodiments, the recommendation value is generated using the function defined by Equation (5), provided below:

$$r_{ij} = l_{u_i}^T l_{e_j} + b_{e_j} \qquad (5).$$

The training module 106 learns the representation vectors based on the training viewing histories 802, which can be, for example, user views of projects in the online content service 110 or other interactions involving content items in the online content service 110. The training module 106 uses the training viewing histories 802 to find the view-based user representation vectors and item representation vectors that minimize a user-item loss function 804. An example of the user-item loss function 804 is the Weighted Approximately Ranked Pairwise ("WARP") loss function provided in Equation (6) below:

$$\sum_{u_i, e^{P_{u_i}}, e_k \in S \setminus P_{u_i}} \ln\left(\frac{Y}{M_{e_k}}\right) \left|1 - l_{u_i}^T l_{e_j} - b_{e_j} + l_{u_i}^T l_{e_k} + b_{e_k}\right|_+. \qquad (6)$$

In Equation (6), the term S represents a set of items available via the online content service 110 (e.g., a set of all items encountered in the training viewing histories 802). The term $P_{u_i}$ represents the set of items viewed by a user $u_i$ (or with which the user $u_i$ has otherwise interacted). The term Y represents the total number of items in the set S. The term $M_{e_k}$ represents the number of negative sampling operations that are performed before encountering an item $e_k$ that produces a non-zero loss. For instance, in the view-based user-and-item representation learning process 518, for each item that the user viewed, the training module 106 iteratively performs sampling negative for each item $e_k$ until $1 + l_{u_i}^T l_{e_k} + b_{e_k} > l_{u_i}^T l_{e_j} + b_{e_j}$ is satisfied.

The user representation vectors described with respect to FIGS. 6-8 are used to implement the projection function learning process 524 referenced in FIG. 5. For example, the training module 106 learns a projection function 524 that receives, as an input, the user representation vector $v_{u_i}$ for a user $u_i$ and computes a training vector $f(v_{u_i})$ by applying the projection function to the user representation vector $v_{u_i}$. The training vector approximates a view-based user representation vector $l_{u_i}$ for the user $u_i$. In some embodiments, the projection function learning process 524 involves minimizing a projection loss function (i.e., a loss function used for identifying the projection function). Equation (7), provided below, is an example of a projection loss function, where the projection function $f$ is learned by minimizing an $l_2$ loss:

$$\sum_{u_i} \|f(v_{u_i}) - l_{u_i}\|^2 \qquad (7).$$

One example of a projection function 528 is a linear function $f$, such as $f(x) = b + Wx$. But other examples, including non-linear functions, may also be used.

The learned projection function 518 allows personalization of the online content service 110 for a given user based on the user's action history in the content manipulation application 108. For example, the user's action history can be used with the trained user representation model 514 to obtain the input user representation vector 514 (i.e., a user representation vector $v_u$). The input user representation vector 514 is transformed with a projection function 528 (i.e., the function $f$) to generate the transformed user representation vector 534 (i.e., the vector outputted by $f(v_u)$). The transformed user representation vector 534 is provided to a recommendation model used by the online content service 110, which generates a recommendation value $r_j$ for an item $e_j$ (e.g., by using the formula $r_j = f(v_u)^T l_{e_j} + b_{e_j}$). An item with a higher value of $r_j$ is more likely to be recommended to the user.

Experimentation Examples

In experiments involving certain embodiments described herein, features for personalizing user experiences with electronic content were tested using six months of usage history from a content manipulation application 108 (e.g., Adobe® Photoshop) and seven years of interaction history from an online content service 110 (e.g., Behance®). In one experiment involving embodiments described in FIGS. 5 and 6, a given action was included in the set of actions to be considered if the action was used by at least 100 unique users. The size of the set of actions to be considered was 1990. A special separation token [E] was added between sessions to indicate the boundary of action sequences. The following hyper-parameters of a user representation model were used. The dimensionality of the representations, M, was set to 500. The sampling window size, 2K+1, was set to 11, i.e., K=5.

In this experiment, a profiling performance of the user representation model was evaluated with a user fingerprinting task. The experiment involved using 200 sessions from users of the content manipulation application 108. Each user's action history $H_i$ was divided into a training subsequence (i.e., $H_i^{train} = H_i[:-200]$) and a validation subsequence (i.e., $H_i^{val} = H_i[-200:]$). The expected performance of user representation model involved linking $H_i^{val}$ with $H_i^{train}$ based on generated user representations. The user's representation was inferred based on the two subsequences. In particular, a user representation vector $v_i^{train}$ was inferred from $H_i^{train}$ and a user representation vector $v_i^{val}$ was inferred from $H_i^{val}$. For each user i and the user's representation $v_i^{train}$, a prediction was made regarding which validation subsequence belonged to the user based on cosine similarities. The validation subsequences $H_j^{val}$ were sorted by the similarities between $v_j^{val}$ and $v_i^{train}$ in a descending order, and the ranking of the user's real validation subsequence $H_i^{val}$ was denoted as $rank_i$. A Mean Reciprocal Rank (MRR), as defined in the Equation (8) below, was used to evaluate the overall fingerprinting accuracy across N users.

$$MRR = \frac{1}{N} \sum_{i=1}^{N} \frac{1}{rank_i}. \qquad (8)$$

The performance of the user representation model was compared to a bag-of-actions model, which counts the frequency that each action occurred. In this experiment, the user representation model outperformed various baselines involving the bag-of-actions model by 31.72%, even if tf-idf was used to down-weight the frequent actions.

Another experiment was used to evaluate the performance of a cold-start recommendation system involving certain embodiments described in FIGS. 5-8. The experiment involved randomly sampling 10,000 users from users who had viewed at least one project or other content item on the online content service 110 during a certain time period. The sampled users were denoted as cold-start users. A most recently viewed project $e_{p_i}$ from each cold-start user $u_i$ was used for validation. Other users' viewing histories were used for training. The experiment also involved a set of 5.8 million content items that were accessible via the online content service 110 and available for recommendation. In the validation process, for each cold-start user, a user's usage data from the content manipulation application 108 was used to make a preference prediction, without relying on any previous views by the user in the online content service 110.

In this experiment, the performance of the cold-start recommendation system was compared to a baseline algorithm that ranks content items based on their popularity (e.g., total number of views received). The experiment involved using a Recall@K function (as defined in Equation (9) below) and Area Under ROC Curve ("AUC") (as defined in Equation (10) below) to evaluate the recommendation performance (N=10,000). An example of a Recall@K function is provided below.

$$\text{Recall}@K = \frac{1}{N} \sum_{i=1}^{N} \delta(e_{p_i} \text{ in the top } K \text{ items for } u_i). \quad (9)$$

$$AUC = \frac{1}{N} \sum_{i=1}^{N} \frac{\sum_{j} \delta(e_{p_i} \text{ in the top } K \text{ items for } u_i)}{\text{size of the items pool}}. \quad (10)$$

The experimental results demonstrated that recommendations based on usage data from the content manipulation application 108 outperformed the baseline in terms of Recall@K and AUC. For top-ranked items (Recall@100), the cold-start recommendation system outperformed the popularity-based recommendation by 21.2%, which indicates that users would potentially be receptive to 21.2% more items recommended by the cold-start recommendation system.

Examples of Additional or Alternative Applications of User Representation Model

The examples described above involve generating content recommendations in online content services using user representation vectors that have been learned from user action histories in a content manipulation service. But other implementations are possible. For instance, other suitable applications may use accurate user representation vectors that have been learned from user action histories.

In some embodiments, one or more training modules 106 are used to develop a tagging system for users of the content manipulation application 108. The tagging system predicts areas of focus users of the content manipulation application 108, who may or may not be active on the online content service 110. User tagging is an important task for software service providers, as accurate tags facilitate the customization of online content provided to users (e.g., targeting online advertisements, personalizing online experience, and providing recommendations of online content, etc.). A user tagging system assigns one or more relevant tags to a user, where the tags are assigned based on the user's behavior in a particular platform (e.g., a software application, an online service, etc.). For example, in the content manipulation application 108, a tagging operation involves predicting users' areas of focus based on software usage patterns. The tagging operation analyzes the user's action in the content manipulation application 108 to predict whether a user is focusing on, for example, web design features, user interface or user experience features, architecture features, etc.

In the absence of a training module 106 as described herein, building a user tagging system may require a significant amount of domain knowledge and human labor to bootstrap the training labels. For instance, expert software developers may need to manually examine raw usage histories and identify tags for a large number of users. This manual labeling process is subject to diverse human expertise in recognizing the patterns, and is therefore error-prone and incomprehensive.

By contrast, the training module 106 described herein can facilitate building an accurate user-tagging system with minimal human efforts. For example, information about users' expertise and areas of focus may be provided to an online content service 110 by users of the online content service 110. By leveraging the self-disclosed tags from the online content service 110 and the accurate user representation vectors derived from the user-representation model described herein, the training module 106 can build a user tagging system that is more accurate and robust than existing approaches.

In some embodiments involving a user tagging system, one or more training modules 106 access data generated by interactions from N users. The data includes a set of self-disclosed tags, $t_{u_i}$ (i=1, 2, . . . , N), that the users have provided to the online content service 110. The data also includes user representation vectors $v_{u_i}$ that are derived from usage traces or other application usage records 116 generated from the content manipulation application 108, as described in the examples from FIGS. 6 and 7. A given tag is represented by a vector $t_{u_i}$ that encodes a tag with d dimensions. The training module 106 learns a user tagging model $f$ that takes $v_{u_i}$ as an input and produces an output to approximate $t_{u_i}$. The training module 106 trains a user tagging model by minimizing a sigmoid cross-entropy loss function, as defined in Equation (11) below:

$$-\frac{1}{N} \sum_{i=1}^{N} t_{u_i} \log(\sigma(f(v_{u_i}))) + (1 - t_{u_i}) \log(1 - \sigma(f(v_{u_i}))). \quad (11)$$

In this equation, the value of the jth element in $t_{u_i}$, $t_{u_i}[j]$, is 1 if the jth tag is selected by the user $u_i$. The value of $t_{u_i}[j]$ is 0 if the jth tag is not selected by the user $u_i$. Model $f$ in the equation above can be any suitable linear function, such as a linear projection $f(x)=b+Wx$, or any suitable non-linear function.

In some embodiments, the training module 106 trains the tagging model using an optimization algorithm, such as limited-memory BFGS, over areas that are indicated by at least 100 active users in the online content service 110. With such a filtering criteria, the training module 106 selects a subset of the available tags. For any user of a content manipulation application 108, the trained tagging model is usable for assigning tags by applying a classifier from the tagging model to the user's application usage history, even if the user has never accessed the online content service 110.

In one experiment involving a tagging model, an evaluation was conducted using 65,331 users who self-disclosed at least one of the subset of available tags selected by the training module 106. Each user was assigned to a smaller subset of tags (e.g., one to five tags). The users were randomly divided into a training set of 45,331 samples and a validation set of 20,000 samples. The baseline approach, to which the tagging model was compared, ranked tags based on their number of appearances in a platform involving an online content service. An average recall rate, Recall@K, as defined in Equation (12) below, was used to quantitatively compare the tagging performance.

$$\text{Recall@}K = \frac{\text{number of correct tags in top } K \text{ predictions}}{\text{total number of tags in the ground truth set}}. \quad (12)$$

In this experiment, the tagging model, which leveraged action histories from a content manipulation application, significantly outperformed a baseline, which did not use such information. For instance, the experiment identified improvements of 31.0% and 35.0% in terms of Recall@1 and Recall@2 respectively.

Figure 9:
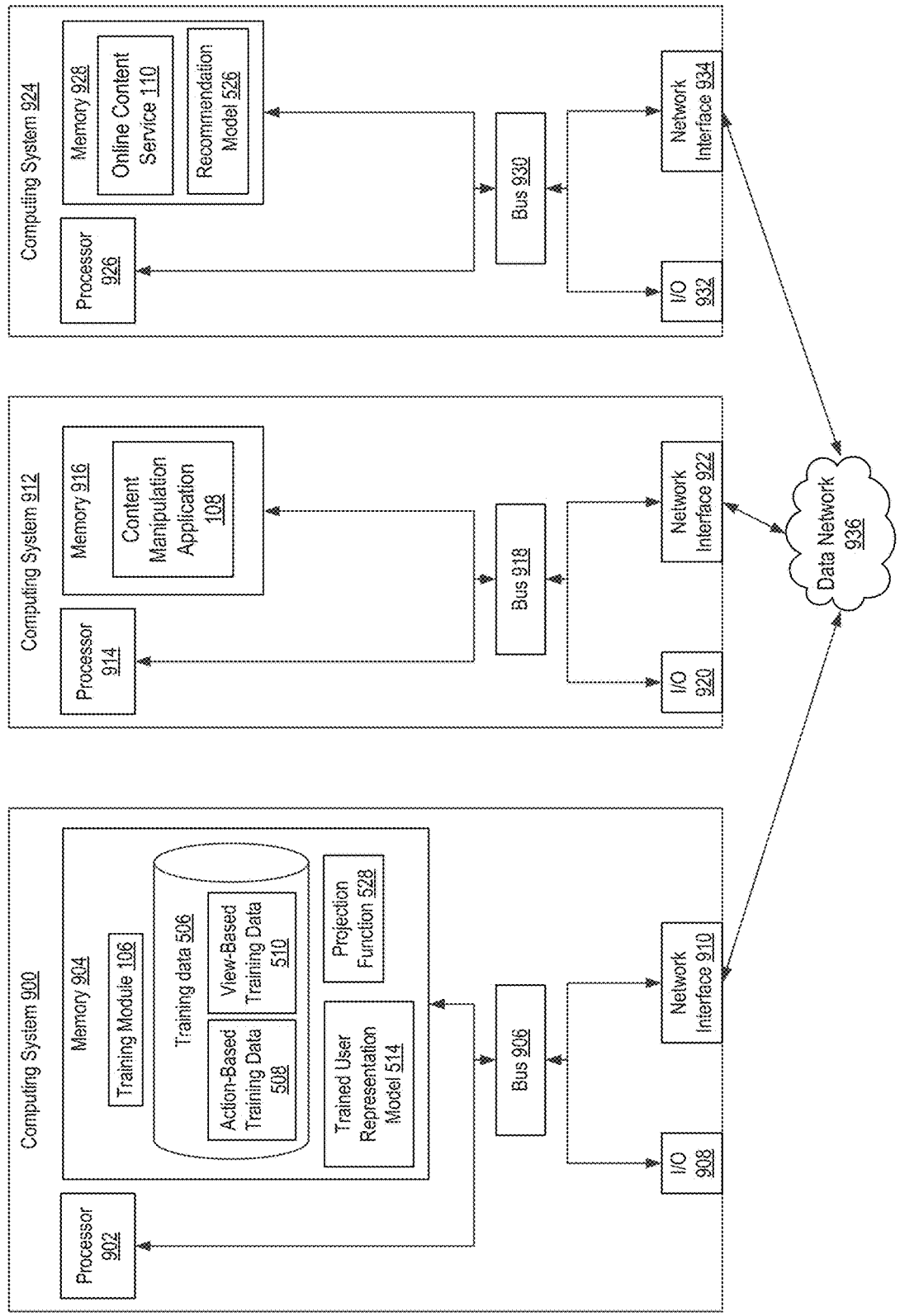
FIG. 9 depicts examples of computing systems that perform certain operations described herein, according to certain embodiments.

In additional or alternative embodiments, a trained user-representation model as described herein is usable in an inspiration engine, thereby enabling innovative user experiences. The inspiration engine, which includes program code stored in a non-transitory computer-readable medium and executable by a processing device (examples of which are depicted in FIG. 9), is a search engine that can return creative content (e.g., art projects) that is likely to be produced by a given sequence of actions performed in the content manipulation application 108. In some embodiments, the inspiration engine provides real-time and personalized inspirations for creative professionals when using a content manipulation application 108. For example, the inspiration engine shows the potential outcomes of the actions that have been or are likely to be performed. Such presentations provide helpful insights to creative professionals by facilitating the exploration of a wider range of possibilities that are related but different from a current work by the creative professional.

The training module 106 is used to build the inspiration engine based on a correspondence between pairs of (i) usage histories for users of the content manipulation application 108 and (ii) content items (e.g., images) that have been provided by the users to the online content service 110. The training module 106 can learn a heterogeneous joint embedding for a space defined by representation vectors of actions and content items. In the learned heterogeneous joint embedding, true pairs are close to each other in the space and false pairs are distance from one another. A "true pair" is a actions-content pair in which an action history has a strong correspondence to a content item. A "false pair" is a actions-content pair in which an action history has a weak correspondence to a content item.

For example, for each actions-content pair $((a_1^i, a_2^i, \ldots, a_n^i), c_i)$, $i=1, 2, \ldots, n$, the training module 106 derives features for the action sequence $a_1^i, a_2^i, \ldots, a_n^i$ and the content item $c_i$, respectively. The feature derived for the action sequence is the user representation vector $v_i$, and the feature derived for the content item is the content representation vector $z_i$. The training module 106 derives the user representation vector $v_i$ from the user-representation model as described above with respect to FIGS. 6 and 7. The training module 106 derives the content representation vector $z_i$ from a pooling layer of a pre-trained feature extractor for content (e.g., 2048 dimensions of the ResNet extractor). The training module 106 learns a function g to project the content representation vector $z_i$ to the space of the user-representation model such that the objective function $\Sigma_i \|v_i - g(z_i)\|^2$ is minimized.

In one experiment, a linear projection function g was trained with 353,205 actions-image pairs from 43,441 users and validated over 20,000 held-out pairs from 20,000 users (i.e., each user contributing exactly one pair in the validation). No user overlap was present in the training and validation sets. The training was conducted using a 1-bfgs algorithm. Recall@K and AUC functions, as described above, were used to evaluate the system performance. The experiment result in improvements over a "random guess" baseline. The nearest neighbors of each action reflected the scenarios in which the action is often used. For example, the action drag path may be heavily used in web design, and the action rotate_canvas may typically be used for creating repetitive patterns.

Computing System Examples

Any suitable computing system or group of computing systems can be used for performing the operations described herein. For example, FIG. 9 depicts examples of computing system 900 that executes a training module 106, a computing system 912 that executes the content manipulation application 108, and a computing system 924 that executes the online content service 110, according to certain embodiments. In some embodiments, the computing systems 900, 912, 924 are separate computing systems or devices communicatively coupled via a data network 102. In additional or embodiments, one or more of the computing systems 900, 912, 924 can be included in the same computing system or device rather than operating separately. In various embodiments, one or more of the computing systems 900, 912, 924 can operate independently of the other depicted computing systems, can be configured in a distributed computing system with one or more of the other depicted computing systems, or some combination thereof.

The depicted examples of the computing systems 900, 912, 924 include processors 902, 914, 926 communicatively coupled to one or more memory devices 1404. Each of the processors 902, 914, 926 executes computer-executable program code stored in a memory device (e.g., the memory devices 904, 916, 928), accesses information stored in the memory device, or both. Examples of the processors 902, 914, 926 include a microprocessor, an application-specific integrated circuit ("ASIC"), a field-programmable gate array ("FPGA"), or any other suitable processing device. Each of the processors 902, 914, 926 can include any number of processing devices, including one.

Each of the memory devices 904, 916, 928 includes any suitable non-transitory computer-readable medium for storing program code, data, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing systems 900, 912, 924 may also include a number of external or internal devices such as input or output devices. For example, the computing systems 900, 912, 924 are shown with respective input/output ("I/O") interfaces 908, 920, 932 that can receive input from input devices or provide output to output devices. Buses 906, 918, 930 can also be included in the respective computing systems 900, 912, 924. Each of the buses 906, 918, 930 communicatively couples one or more components of a respective one of the computing systems 900, 912, 924.

Each of the computing systems 900, 912, 924 executes program code that configures the processors 902, 914, 926 to perform one or more of the operations described herein. The program code includes, for example, the training module 106, the content manipulation application 108, the online content service 110, or other suitable applications that perform one or more operations described herein. The program code may be resident in the memory devices 904, 916, 928 or any suitable computer-readable medium and may be executed by the processors 902, 914, 926 or any other suitable processor. In some embodiments, the training module 106, the content manipulation application 108, and the online content service 110 are respectively stored in the memory devices 904, 916, 928, as depicted in FIG. 9. In additional or alternative embodiments, one or more of the training module 106, the content manipulation application 108, and the online content service 110 is stored in the same memory device (e.g., one of the memory devices 904, 916, 928). In additional or alternative embodiments, the program code described above is stored in one or more other memory devices accessible via a data network.

The computing systems 900, 912, 924 can access one or more of the training data 506 (e.g., action based training data 508, view-based training data 510, or other training data obtained from application usage records 116), the trained user representation model 514, the projection function 528, and the recommendation 526 in any suitable manner. In some embodiments, some or all of one or more of these data sets, models, and functions are stored in the memory devices 904, 916, 928, as in the example depicted in FIG. 9. For example, a computing system 900 that executes the training module 106 can provided access to one or more of the trained user representation model 514 and the projection function 528 by external systems that execute the content manipulation application 108, the online content service 110, or both.

In additional or alternative embodiments, one or more of these data sets, models, and functions are stored in the same memory device (e.g., one of the memory devices 904, 916, 928). For example, a common computing system, such as the creative apparatus 118 depicted in FIG. 1, can host the training module 106, the content manipulation application 108, and the online content service 110, as well as one or more of the trained user representation model 514, the recommendation model 526, and the projection function 528. In additional or alternative embodiments, one or more of these programs, data sets, models, and functions are stored in one or more other memory devices accessible via a data network.

The computing systems 900, 912, 924 also include respective network interface devices 910, 922, 934. Each of the network interface devices 910, 922, 934 includes any device or group of devices suitable for establishing a wired or wireless data connection to one or more data networks. Non-limiting examples of the network interface devices 910, 922, 934 include an Ethernet network adapter, a modem, and/or the like. The computing systems 900, 912, 924 are able to communicate with one or more other computing devices via a data network 936 using the network interface devices 910, 922, 934.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for learning, from application usage data, user representations that are usable for personalizing user experiences with electronic content, the method comprising:

accessing, by a computing system and from a memory device, training action histories for users of a content manipulation application, wherein each training action history comprises a respective sequence of user actions performed by a respective user with the content manipulation application;

accessing, by the computing system, a user representation model, wherein the user representation model includes a probability function and user representation vectors indicating respective software usage patterns for the users, wherein the user representation vectors have respective initial values;

training, by the computing system, the user representation model via iterations, wherein training the user representation model comprises, for each iteration of at least some of the iterations:
- selecting, from a respective training action history for a respective user, respective training data comprising (i) a respective target action, (ii) a respective set of previous actions performed before the respective target action, and (iii) a respective set of subsequent actions performed after the respective target action, wherein each of the respective target action, the respective set of previous actions and the respective set of subsequent actions is represented by an action vector encoding a corresponding action,
- computing a respective initial output by applying the probability function to action vectors of the respective set of previous actions and the respective set of subsequent actions, and a respective user representation vector for the respective user,
- adjusting at least the respective user representation vector for the respective user and one or more of the action vectors of the respective set of previous actions and the respective set of subsequent actions to increase a value of an output of the probability function based on the respective initial output being less than a respective maximized output of the probability function; and
- outputting a set of adjusted user representation vectors from the trained user representation model, wherein the adjusted user representation vectors improves the user representation model for predicting target actions in the content manipulation application from sequences of actions in the content manipulation application.

2. The method of claim 1, wherein the user representation model further comprises (i) a weight vector, (ii) an action representation matrix having action vectors representing available actions in the content manipulation application and including the action vectors of the respective target action, the respective set of previous actions, and the action vectors of the respective set of subsequent actions, and (iii) a user representation matrix having the user representation vectors, wherein each sequence of user actions in the training action histories comprises a respective subset of the action vectors,
- wherein the initial outputs are computed, in the iterations, by applying the probability function to the weight vector, the action representation matrix, and the user representation matrix in addition to the action vectors of the respective set of previous actions and the respective set of subsequent actions, and the respective user representation vector for the respective user, and
- wherein training the user representation model comprises adjusting values of the weight vector, adjusting values of the action vectors used to represent the available actions in the action representation matrix, and adjusting values of the user representation vectors used to represent usage patterns in the user representation matrix, wherein the weight vector, the action representation matrix, and the user representation matrix are adjusted based on at least some initial outputs of the probability function being less than corresponding maximized outputs of the probability function for at least some of the training action histories.

3. The method of claim 2, wherein, for each iteration, the probability function computes a respective probability of the respective target action using a transfer function that combines at least the respective user representation vector, and a respective subset of the action vectors representing the respective set of previous actions and the respective set of subsequent actions.

4. The method of claim 3, wherein the probability function computes each probability by applying a softmax function to a transfer function output computed with the transfer function, wherein the probability function computes the initial outputs and the maximized outputs from a logarithmic function that is respectively applied to the probabilities.

5. The method of claim 1, further comprising:
- learning, with the computing system, a projection function that transforms the adjusted user representation vectors into recommendation user representation vectors, respectively, that are usable with a recommendation model for computing recommendation values indicating user preferences for content items accessible via an online content service that is separate from the content manipulation application;
- accessing, by the computing system, an input user representation vector that is computed from an input action history in the content manipulation application;
- transforming, with the computing system, the input user representation vector into a transformed user representation vector by applying the projection function to the input user representation vector; and
- generating, with the computing system, a content recommendation in the online content service by applying the recommendation model to the transformed user representation vector.

6. The method of claim 5, further comprising computing the recommendation user representation vectors, wherein computing each recommendation user representation vector comprises:
- identifying, based on a respective training viewing history from the online content service, a respective set of content items that has been previously accessed, via the online content service, by a respective user associated with the respective training viewing history;
- identifying a user-item loss function that relates the respective set of content items to (i) a respective initial recommendation user representation vector of the respective user and (ii) a respective set of item representation vectors representing the respective set of content items;
- minimizing the user-item loss function by modifying the respective initial recommendation user representation vector into the recommendation user representation vector and adjusting dimension values in the respective set of item representation vectors, wherein minimizing the user-item loss function optimizes the recommendation model,
- wherein the optimized recommendation model computes, from the recommendation user representation vector and the respective set of item representation vectors with the adjusted dimension values, training recommendation values that are proportional to preferences of the respective user for the respective set of content items.

7. The method of claim 6, wherein learning the projection function comprises minimizing a projection loss function that relates the recommendation user representation vector to a training vector that is computed by applying the projection function to a corresponding one of the user representation vectors from the trained user representation model.

8. The method of claim 6, wherein generating the content recommendation comprises computing, with the optimized recommendation model, output recommendation values from the transformed user representation vector and an item representation vector with adjusted dimension values.

9. A system comprising:
a non-transitory computer-readable medium storing training action histories for users of a content manipulation application, wherein the training action histories comprise sequences of user actions performed by users with the content manipulation application;
means for selecting, from a training action history for a user, training data comprising a target action and a sequence of user actions including the target action;
means for computing an initial output by applying a probability function to the sequence of user actions and a user representation vector for the user, wherein each user action in the sequence of user actions is represented by an action vector encoding a corresponding action, and wherein the user representation vector has an initial value;
means for adjusting at least the user representation vector for the user and one or more of action vectors representing the sequence of user actions to increase a value of an output of the probability function based on the initial output being less than a maximized output of the probability function;
means for transforming an input user representation vector into a transformed user representation vector by applying, to the input user representation vector, a projection function learned from the adjusted user representation vector and a different user representation vector, the different user representation vector based on usage data generated by an online content service that is separate from the content manipulation application; and
means for generating, based on the transformed user representation vector, a content recommendation in the online content service.

10. The system of claim 9, further comprising means for training, via iterations, a user representation model usable for computing the input user representation vector,
wherein the user representation model includes:
a weight vector,
an action representation matrix having action vectors representing available actions in the content manipulation application and including the action vectors of the sequence of user actions, wherein each sequence of user actions in the training action histories comprises a respective subset of the action vectors, and
a user representation matrix having user representation vectors that include the user representation vector,
wherein training the user representation model comprises, for each iteration of least some of the iterations,
selecting, from a respective training action history for a respective user, a respective target action and a respective sequence of user actions included previous actions performed before the respective target action and subsequent actions performed after the respective target action,
computing a respective initial output by applying the probability function to at least the action vectors of the respective sequence of user actions, a respective user representation vector for the respective user, and the weight vector, and
based on the respective initial output being less than a maximized output of the probability function for the respective sequence of user actions:
adjusting values in the weight vector,
adjusting values of the action vectors used to represent the available actions in the action representation matrix, and
adjusting values of the user representation vectors used to represent usage patterns in the user representation matrix.

11. The system of claim 10, wherein, for each iteration of least some of the iterations, the probability function computes a respective probability of the respective target action using a transfer function that combines at least the respective user representation vector, and a respective subset of the action vectors representing the respective sequence of user actions.

12. The system of claim 11, wherein the probability function computes each probability by applying a softmax function to a transfer function output computed with the transfer function, wherein the probability function computes the initial outputs and the maximized outputs from a logarithmic function that is respectively applied to the probabilities.

13. The system of claim 10, further comprising computing recommendation user representation vectors that include the different user representation vector, wherein computing each recommendation user representation vector comprises:
identifying, based on a respective training viewing history from the online content service, a respective set of content items that has been previously accessed, via the online content service, by a respective user associated with the respective training viewing history;
identifying a user-item loss function that relates the respective set of content items to (i) a respective initial recommendation user representation vector of the respective user and (ii) a respective set of item representation vectors representing the respective set of content items;
minimizing the user-item loss function by modifying the respective initial recommendation user representation vector into the recommendation user representation vector and adjusting dimension values in the respective set of item representation vectors, wherein minimizing the user-item loss function optimizes a recommendation model that generates recommendation values indicating user preferences for content items accessible via the online content service,
wherein the optimized recommendation model computes, from the recommendation user representation vector and the respective set of item representation vectors with the adjusted dimension values, training recommendation values that are proportional to preferences of the respective user for the respective set of content items.

14. The system of claim 13, further comprising means for learning the projection function by minimizing a projection loss function that relates the recommendation user representation vector to a training vector that is computed by applying the projection function to a corresponding one of the user representation vectors from the trained user representation model.

15. The system of claim 13, wherein generating the content recommendation comprises computing, with the optimized recommendation model, output recommendation values from the transformed user representation vector and an item representation vector with adjusted dimension values.

16. A non-transitory computer-readable medium having program code that is stored thereon and that is executable by a processing device for performing operations, the operations comprising:
   accessing training action histories for users of a content manipulation application, wherein each training action history comprises a respective sequence of user actions performed by a respective user with the content manipulation application;
   accessing a user representation model, wherein the user representation model includes a probability function and user representation vectors indicating respective software usage patterns for the users, wherein the user representation vectors have respective initial values;
   training the user representation model via iterations, wherein training the user representation model comprises, for each iteration of at least some of the iterations:
      selecting, from a respective training action history for a respective user, respective training data comprising (i) a respective target action, (ii) a respective set of previous actions performed before the respective target action, and (iii) a respective set of subsequent actions performed after the respective target action, wherein each of the respective target action, the respective set of previous actions and the respective set of subsequent actions is represented by an action vector encoding a corresponding action,
      computing a respective initial output by applying the probability function to action vectors of the respective set of previous actions and the respective set of subsequent actions, and a respective user representation vector for the respective user,
      adjusting at least the respective user representation vector for the respective user and one or more of the action vectors of the respective set of previous actions and the respective set of subsequent actions to increase a value of an output of the probability function based on the respective initial output being less than a respective maximized output of the probability function; and
   outputting a set of adjusted user representation vectors from the trained user representation model, wherein the adjusted user representation vectors improves the user representation model for predicting target actions in the content manipulation application from sequences of actions in the content manipulation application.

17. The non-transitory computer-readable medium of claim 16, wherein the user representation model further comprises (i) a weight vector, (ii) an action representation matrix having action vectors representing available actions in the content manipulation application and including the action vectors of the respective target action, the respective set of previous actions, and the action vectors of the respective set of subsequent actions, and (iii) a user representation matrix having the user representation vectors, wherein each sequence of user actions in the training action histories comprises a respective subset of the action vectors,
   wherein the initial outputs are computed, in the iterations, by applying the probability function to the weight vector, the action representation matrix, and the user representation matrix in addition to the action vectors of the respective set of previous actions and the respective set of subsequent actions, and the respective user representation vector for the respective user, and
   wherein training the user representation model comprises adjusting values in the weight vector, adjusting values of the action vectors used to represent the available actions in the action representation matrix, and adjusting values of the user representation vectors used to represent usage patterns in the user representation matrix, wherein the weight vector, the action representation matrix, and the user representation matrix are adjusted based on at least some initial outputs of the probability function being less than corresponding maximized outputs of the probability function for at least some of the training action histories.

18. The non-transitory computer-readable medium of claim 17, wherein, for each iteration, the probability function computes a respective probability of the respective target action using a transfer function that combines at least the respective user representation vector, and a respective subset of the action vectors representing the respective set of previous actions and the respective set of subsequent actions.

19. The non-transitory computer-readable medium of claim 16, the operations further comprising:
   learning, with the computing system, a projection function that transforms the adjusted user representation vectors into recommendation user representation vectors, respectively, that are usable with a recommendation model for computing recommendation values indicating user preferences for content items accessible via an online content service that is separate from the content manipulation application;
   accessing, by the computing system, an input user representation vector that is computed from an input action history in the content manipulation application;
   transforming, with the computing system, the input user representation vector into a transformed user representation vector by applying the projection function to the input user representation vector; and
   generating, with the computing system, a content recommendation in the online content service by applying the recommendation model to the transformed user representation vector.

20. The non-transitory computer-readable medium of claim 19, the operations further comprising computing the recommendation user representation vectors, wherein computing each recommendation user representation vector comprises:
   identifying, based on a respective training viewing history from the online content service, a respective set of content items that has been previously accessed, via the online content service, by a respective user associated with the respective training viewing history;
   identifying a user-item loss function that relates the respective set of content items to (i) a respective initial recommendation user representation vector of the respective user and (ii) a respective set of item representation vectors representing the respective set of content items;
   minimizing the user-item loss function by modifying the respective initial recommendation user representation vector into the recommendation user representation vector and adjusting dimension values in the respective set of item representation vectors, wherein minimizing the user-item loss function optimizes the recommendation model, wherein the optimized recommendation model computes, from the recommendation user representation vector and the respective set of item representation vectors with the adjusted dimension values, training recommendation values that are proportional to preferences of the respective user for the respective set of content items.

* * * * *